O. N. CHASE.
Corn-Planter.

No. 45,976.

Patented Jan. 24, 1865.

Witnesses:
Loring A. Chase
Mary L. Ela

Inventor:
Otis N. Chase

UNITED STATES PATENT OFFICE.

OTIS N. CHASE, OF BOSTON, MASSACHUSETTS.

COMBINED SEED AND POTATO PLANTER.

Specification forming part of Letters Patent No. 45,976, dated January 24, 1865; antedated January 8, 1865.

*To all whom it may concern:*

Be it known that I, OTIS N. CHASE, of Boston, in the county of Suffolk and State of Massachusetts, have invented a new and improved planter for planting potatoes, corn, beans, and other seed in hills, drills, check-rows, or otherwise; and I do hereby declare that the following is a full, clear, and exact description of the construction and operation of the same, reference being had to the annexed drawings, of which—

Figure 1:
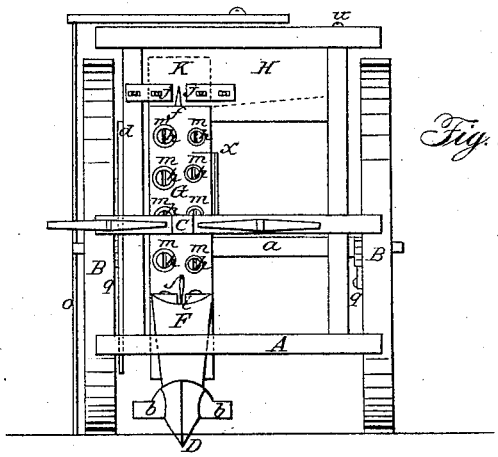
Figure 2:
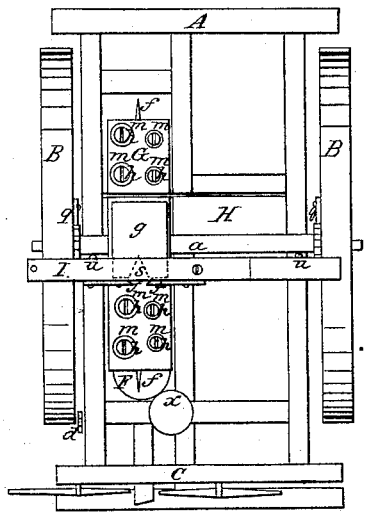

Figure 1 is a front elevation; Fig. 2, a top view; and Fig. 3, a side elevation, with one wheel, B, and its pawl and ratchet removed, letters of reference being used.

To enable others skilled in the art to make and use my invention, I will proceed to describe its construction and operation.

Figure 3:
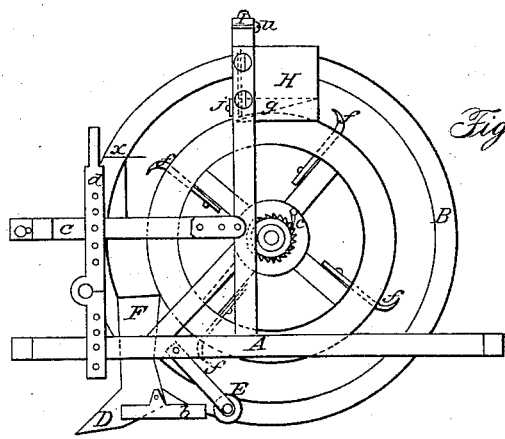

In Figs. 1, 2, and 3, A is a frame hanging upon the axle $a$, between the wheels B B, Fig. 2, and two feet, or thereabout, below axle $a$, and composed of two beams running lengthwise of the machine and parallel and strongly connected by cross-pieces, (seen in Fig. 2,) the spaces between being sometimes filled in with plank and constituting a platform.

C, Figs. 2 and 3, is another frame (hanging) in front of (and a little above) the axle $a$, composed of two parallel beams running lengthwise of the machine and firmly braced by cross-pieces. I sometimes attach the platform on frame A to frame C instead.

In Figs. 1 and 2 the wheels B B and axle $a$ are connected by the ratchet-wheels and pawls $q\ q$, so that they rotate together forward and independently backward.

Connected with axle $a$ is the frame A. Said axle turns freely in boxes (which may be adjustable) in said frame A. Connected with said frame A or otherwise to said axle $a$ is the frame C, upon which is the driver's seat $x$, to which frame horses (or other power) are attached for moving the planter. The frames A and C are also connected by the toggle-lever $d$. The purpose of said lever $d$ is to elevate and depress the plow D, Figs. 1 and 3. This lever $d$ has a joint near its middle, with holes for graduation upon each side of said joint.

Attached to the front of the frame A is the winged plow D, which is for opening the earth to the proper depth and width to admit the seed, which seed is covered with earth by the wings $b\ b$ (see Fig. 1) and roller E. (See Fig. 3.) The wings $b\ b$ are attached (see Fig. 3) to plow D in its rear, (and may be made adjustable on said plow E.) The roller E is attached to frame A by a hinged joint, or otherwise, in the rear of the plow D. The purpose of the roller E is to more effectually cover and level the earth above the seed. Above the plow D (see Fig. 3) is the seed-conveyer F, (which is, or may be, a part of plow D,) for conveying the seed from the seed-wheel G to the ground in the rear of the plow D, but in front of the wings $b\ b$.

At the top of F, in the side next to wheel G, is a slit, $i$. (See Fig. 1.)

Above and behind the plow D and the conveyer F, and connected with the axle $a$ by a pawl and ratchet, $c$, Fig. 3, is the seed-wheel G. (See Figs. 1, 2, and 3.) Inserted in the periphery of this wheel G are the knives or hooks $f\ f\ f\ f$, (see Fig. 3,) with their edges or points projecting beyond the periphery of the wheel G. (I sometimes curve the points, as seen in the drawings.) Said knives or hooks have slots at their lower end within wheel G, by which they are attached to wheel G, and are adjustable out or in by means of set-screws, (or they may be otherwise made adjustable.) There is also inserted in the periphery of this wheel G a series of holes or cavities, (in a double row or otherwise,) of any desirable diameter and depth and distance apart. Within these holes or cavities $m\ m\ m\ m\ m\ m\ m\ m$, Figs. 1 and 2, (which are placed all round the wheel G,) are inserted screws $h\ h$, &c., (see Figs. 1 and 2), for measuring the quantity of seed to be planted (by making these holes deeper or more shallow) and for filling up one set of holes when another set is required. This is done by turning the screws $h\ h$, &c., out or in, as the occasion may require.

Separate wheels or rolls may be used for different kinds of seed to be planted or sown, the holes in each wheel being made of the appropriate size (thus dispensing with the use of screws $h\ h$, &c.) and the proper distance apart, as may be required for the special purpose of each wheel, for sowing, or planting in rows, drills, or otherwise.

Above the wheel G is the seed-box H, (which may be placed otherwise than as represented— viz., either in front or rear of said wheel G.) This seed-box H is so constructed that it may be used for all kinds of seed planting or sowing by slight changes as hereinafter described; or separate seed-boxes may be used for the different kinds of seed. Said seed-box H extends across the frame A, and is attached to the uprights, which are a part of the frames A or C. Seed-box H has within it an inclined plane, g, (see Fig. 3, dotted lines, and Fig. 2,) inclined forward, which plane g is above wheel G, and has a slot, s, at its lower end, as indicated by the dotted lines in Fig. 2. A portion of the front side of said seed-box H, in front of said slot, is removed, leaving a space large enough to allow a potato or seed to pass. Attached to said seed-box H, in front of said portion removed, are two adjustable springs, j j, (see Figs. 1 and 2,) one upon each side of the removed portion, (or they may be differently arranged.) One spring may answer the purpose of two springs. There is also attached to the front inner side of this seed-box H, above the wheel G, an adjustable slide, k, which may have an elastic substance at its lower end, for the purpose of preventing any seed passing, except that within holes m m, &c. This slide k is a thin strip of material of nearly the same width as seed-wheel G, which may be of any length or width desired. The knives of hooks f f f f, inclined plane g, slot i in the conveyer F, and springs j j, or their equivalents, are used for planting potatoes. The holes or cavities m m, &c., slide k, with elastic bottom strip and pawl and ratchets, are used in planting corn, beans, and other small seeds.

Attached to the planter, above the seed-box H, near the middle of the machine, by a pivot or otherwise, is the marking-stick I, Figs. 1, 2, and 3, which has a chain or rope attached to its outer end, which chain or rope drags upon the ground, and is easily adjusted to any part of the marking-stick, thus making the rows planted wider or more narrow. Said marking-stick I is easily turned from one side of the machine to the other, and is held in the desired position by means of the projections u u, Fig. 2, or other device. The purpose of this marking-stick I is to allow the chain or rope to trail upon the ground, thus making a mark as a guide for the next row. I sometimes use more than one chain. The seed-wheel G may have a separate shaft from the axle a, and be placed nearer the plow D. The front end of frame A may be attached to frame C, to the front of it, and lever d may be placed in the rear of said plow D; or the plow D may be attached to the frame C and made adjustable up and down by means of a joint, or otherwise, with lever d or other device.

The frames A and C may be used separate from each other, and may be constructed in a different manner from that in which they are shown. The pawl and ratchet c, Fig. 3, are used only when the machine is in operation. The pawl may be raised from the ratchet c by a lever or other suitable device. A covering may be placed round the seed-wheel G, to keep the seed in the holes until it reaches the conveyer F. Further, any of the known seeding devices may be used on the frames A and C. The roller E (with suitable apparatus attached, as herein described) may be lifted from the ground by the lever d, or by an additional lever of its own. The frame A and C and lever d may be used with more than one plow for plowing, and the seeding apparatus being detached, the plows may be elevated and depressed, as hereinabove described. The knives f f f f may strike against the lower side of the inclined plane g; or projections may be placed in the perimeter of the seed-wheel G, so as to impart a vibrating motion to the inclined plane g when they come in contact with it, for the purpose of working the seed down in front of said plane g and within the slot s. When the seed-box H is placed otherwise than above the seed-wheel G, the springs j j and inclined plane g are differently arranged.

It is not necessary, when the seed-box H is in front, that the knives f, &c., should have an edge or hooks, and the slit i may also then be dispensed with. The frames A and C are substantially the same, and the toggle-lever d, as those described in my improved potato-harvester. The frame or platform in the rear of axle a is not needed for planting purposes.

The operation of the machine—say for planting potatoes—is as follows: Horse or other power is attached to frame C. The seed-wheel G and axle a are disconnected by raising the pawl from the ratchet c, so that the axle a may turn independently of the wheel G. The inclined plane g is adjusted so that the slotted end will rest on or near the perimeter of the wheel G. The slide K is removed from the opening in the rear of the springs j j. The seed-box H is filled with potatoes. The knives or hooks f, &c., are pushed out from the periphery of the wheel G, and held in the desired position by their set-screws. The springs j j are adjusted by sliding back or forward, so as to allow a potato, when upon a knife or hook, to pass. The driver seats himself on the seat x, and, by means of the lever d, lifts the plow from the ground, and drives to the field to be planted. He then, beginning to plant, lets the pawl c come in contact with its ratchet, so that the axle a and wheel G may rotate together forward, (but, as above-mentioned, independently backward.) The marking-stick I and chain or rope o are adjusted so as to mark out the succeeding row to be planted. The plow D is adjusted so as to make a furrow of the proper depth and width. The driver then depresses the plow D with the lever d, and drives across the field, (in a straight line,) which causes wheels B B, axle a, and seed-wheel G to rotate together forward. The knives or hooks f, &c., will pass beneath the inclined plane g and through the slot S in said plane g, and cut or stick into a potato, which may be in or in front of said slot S. As the wheels G rotates, the potatoes on said knives or hooks $f$, &c., are crowded against and between the ends of the springs $j\,j$, and carried down to the slit $i$ in conveyer F, and the potatoes are removed or scraped off from said knives by the sides of said slit $i$ into the conveyer F and drop down in the rear of the plow D, but in front of the wings or coverers $b\,b$ and the roller E, which wings and roller cover up the seed.

For planting corn and other kinds of seed, the incline plane $g$ is removed, the slide $k$ is let down and held in the desired position by means of set-screws, the knives or hooks $f$, &c., are drawn in flush with the perimeter of the wheel G, and held there by means of their respective set-screws. The holes $m$, &c., in said wheel G are gaged by screws $h$, &c., within said holes $m\,m$, &c. By turning them in or out, the desired quantity of seed may be measured to be dropped in one place. The box H is filled with seed, and as the wheel rotates, the cavities $m\,m$, &c., are filled with seed. The elastic at the bottom of slide $k$ will allow no seed to pass except that within said cavities $m\,m$, &c., which seed is carried forward and falls behind the plow D, and is covered in the manner before stated.

In order to have the rows the same distance apart both ways, all the holes $m\,m$, &c., in wheel G but the desired ones are filled by screwing out the filling-screws $h\,h$, &c., and at the commencement of each row the seed-wheel G is turned by the hand of the driver, so as to drop the first hill parallel to the first hill in the previous planted row. The marking-stick I and chain or rope $o$ are turned to the other side of the machine when said machine is to recross the field. Only one person—the driver—is required to operate the machine.

I do not claim any particular mode of constructing the frames A or C; nor do I claim the wheel G, with the cavities $m\,m$, &c.; nor do I claim the filling up the perforations or cavities with the screws $h\,h$, &c.; but

What I claim herein as of my own invention, and desire to secure by Letters Patent, is—

1. The combination and arrangement of the toggle-lever $d$ and the frames A and C with one or more plows, substantially as described.

2. The projections represented by the knives or hooks $f\,f$, &c., in combination with the stripping-slot $i$ or its equivalent, substantially as described, for the purpose set forth.

3. The combination and arrangement of the springs $j\,j$, inclined plane $g$, and seed-box H, with the projections as represented by the knives or hooks $f\,f$, &c., substantially as described, for the purpose set forth.

OTIS N. CHASE.

Witnesses:
I. W. RICHARDSON,
MARY L. ELA.